US006314876B1

(12) United States Patent
Ackley

(10) Patent No.: US 6,314,876 B1
(45) Date of Patent: Nov. 13, 2001

(54) METHOD AND APPARATUS FOR TRANSPORTING AND PROCESSING A PLURALITY OF ARTICLES, AND SHAPED ARTICLE HAVING SERIALLY REGISTERED COMPONENT IMAGES

(75) Inventor: E. Michael Ackley, Stone Harbor, NJ (US)

(73) Assignee: Ackley Machine Corporation, Moorestown, NJ (US)

( * ) Notice: Subject to any disclaimer, the term of this patent is extended or adjusted under 35 U.S.C. 154(b) by 0 days.

(21) Appl. No.: 09/326,672

(22) Filed: Jun. 7, 1999

(51) Int. Cl.[7] .............................. B41F 17/36; B65G 47/00

(52) U.S. Cl. ............................ 101/44; 101/485; 101/490; 198/803.1; 198/803.3; 198/803.14; 198/867.02; 198/867.11; 424/439; 426/383

(58) Field of Search ......................... 426/87, 383; 101/35, 101/40, 44, 485, 490; 198/803.3, 803.8, 803.1, 803.11, 803.13, 803.14, 867.02, 867.11; 425/360, 362, 442; 424/467, 439

(56) References Cited

U.S. PATENT DOCUMENTS

| | | | | |
|---|---|---|---|---|
| 237,074 | | 1/1881 | Baldwin . | |
| 807,541 | | 12/1905 | Cunningham et al. . | |
| 883,563 | | 3/1908 | Parrish . | |
| 958,252 | | 5/1910 | Jenkins . | |
| 1,400,124 | * | 12/1921 | Wolverton | 84/385 R |
| 1,755,456 | * | 4/1930 | Nutter et al. | 101/40 |

(List continued on next page.)

FOREIGN PATENT DOCUMENTS

| | | | |
|---|---|---|---|
| 928 569 | * | 6/1973 | (CA) . |
| 0 734 655 A1 | | 10/1996 | (EP) . |
| 0 739 957 A1 | | 10/1996 | (EP) . |
| 0 919 377 A1 | | 6/1999 | (EP) . |
| 22140 | | 10/1910 | (GB) . |
| 21221 | | 9/1912 | (GB) . |

(List continued on next page.)

*Primary Examiner*—Milton I. Cano
*Assistant Examiner*—Robert Madsen
(74) *Attorney, Agent, or Firm*—Oliff & Berridge, PLC

(57) ABSTRACT

An apparatus for transporting and processing a plurality of articles includes a transport loop including a plurality of carrier bars and a plurality of pockets formed between adjacent ones of the carrier bars. The articles are laterally, longitudinally and rotationally positioned within the pockets at a predetermined position, and at least a first processing station at a first position along the transport loop performs a first operation on the articles while within the pocket in the predetermined position. The articles may be pharmaceutical tablets or capsules and the first processing station may be a drill that drills a series of holes on the pharmaceuticals to create a mechanical time-release mechanism. A second processing station coordinated with the first processing station may perform a second operation on the articles. The first and second processing stations may be first and second printers that print first and second component images in registration with another to form a composite image. The apparatus can be used to manufacture shaped edible articles having a non-planar portion that receive serially registered component images from first and second printers. The first and second component images are formed in registration with one another to form a composite image even though the non-planar portion is spaced from the printing plane by variable distances.

18 Claims, 7 Drawing Sheets

U.S. PATENT DOCUMENTS

| | | | |
|---|---|---|---|
| 2,102,808 | 12/1937 | Piperoux . | |
| 2,105,400 * | 1/1938 | Booth | 101/35 |
| 2,203,079 | 6/1940 | Chandler . | |
| 2,298,955 | 10/1942 | Mason et al. . | |
| 2,682,253 | 6/1954 | Scherer et al. . | |
| 2,687,085 * | 8/1954 | Koffler | 100/97 |
| 2,785,786 | 3/1957 | Barlett . | |
| 2,825,278 | 3/1958 | Schwisow . | |
| 2,929,320 | 3/1960 | Hansen et al. . | |
| 3,272,159 | 9/1966 | Sanderson . | |
| 3,363,804 | 1/1968 | Frasier . | |
| 3,439,520 | 4/1969 | Schwartz . | |
| 3,601,041 | 8/1971 | Perra, Jr. et al. | 101/37 |
| 3,613,865 | 10/1971 | Reimers | 198/131 |
| 3,868,902 | 3/1975 | Bradshaw et al. | 101/44 |
| 3,889,591 | 6/1975 | Noguchi | 101/37 |
| 4,027,054 | 5/1977 | Porod | 427/79 |
| 4,149,623 | 4/1979 | Nelson | 198/477 |
| 4,168,321 | 9/1979 | Okamoto | 426/87 |
| 4,308,942 | 1/1982 | Ackley | 198/380 |
| 4,373,437 * | 2/1983 | Rodenbaugh et al. | 101/35 |
| 4,479,429 | 10/1984 | Haryu | 101/38 A |
| 4,672,892 | 6/1987 | Ackley | 101/35 |
| 4,905,589 | 3/1990 | Ackley | 101/35 |
| 5,433,146 | 7/1995 | Ackley | 101/35 |
| 5,586,642 | 12/1996 | Hawkins | 198/803.11 |
| 5,655,453 | 8/1997 | Ackley | 101/483 |
| 5,768,996 | 6/1998 | Ackley | 101/483 |
| 5,800,601 | 9/1998 | Zou et la. | 106/31.65 |
| 5,836,243 | 11/1998 | Ackley | 101/44 |
| 5,878,658 * | 3/1999 | Ackley | 101/35 |
| 6,085,627 * | 6/2000 | Denney | 83/874 |

FOREIGN PATENT DOCUMENTS

| | | |
|---|---|---|
| 1119302 | 8/1965 | (GB) . |
| 1 007 705 | 10/1965 | (GB) . |
| 2 186 782 A | 8/1987 | (GB) . |
| 2 230 686 A | 10/1990 | (GB) . |
| 48-103787 | 12/1973 | (JP) . |
| 49-52009 | 5/1974 | (JP) . |
| 49-73223 | 7/1974 | (JP) . |
| 49-80219 | 8/1974 | (JP) . |
| 49-46848 | 12/1974 | (JP) . |
| 50-76905 | 7/1975 | (JP) . |
| A 54-70417 | 6/1979 | (JP) . |
| A 55-23955 | 2/1980 | (JP) . |
| A 56-82255 | 7/1981 | (JP) . |
| A 57-058850 | 4/1982 | (JP) . |
| A 57-100071 | 6/1982 | (JP) . |
| A 58-5285 | 1/1983 | (JP) . |
| A 59-145184 | 9/1984 | (JP) . |
| B2 60-5250 | 2/1985 | (JP) . |
| A 60-192537 | 10/1985 | (JP) . |
| U 60-182143 | 12/1985 | (JP) . |
| 361145005 * | 7/1986 | (JP) . |
| A 61-279556 | 12/1986 | (JP) . |
| A 62-138279 | 6/1987 | (JP) . |
| U 62-119232 | 7/1987 | (JP) . |
| U 63-198533 | 12/1988 | (JP) . |
| A 64-16678 | 1/1989 | (JP) . |
| A 2-122975 | 5/1990 | (JP) . |
| A 2-220881 | 9/1990 | (JP) . |
| A 2-239972 | 9/1990 | (JP) . |
| A 3-162988 | 7/1991 | (JP) . |
| B2 4-8227 | 2/1992 | (JP) . |
| A 6-40007 | 2/1994 | (JP) . |
| A7-17018 | 1/1995 | (JP) . |
| A 7-81050 | 3/1995 | (JP) . |
| A 8-176 | 1/1996 | (JP) . |
| A 8-300620 | 11/1996 | (JP) . |
| A 9-39366 | 2/1997 | (JP) . |
| A 10-129104 | 5/1998 | (JP) . |
| 88/05725 | 8/1988 | (WO) . |
| 88/08254 | 11/1988 | (WO) . |
| 97/16075 | 5/1997 | (WO) . |
| 97/27759 | 8/1997 | (WO) . |

* cited by examiner

METHOD AND APPARATUS FOR TRANSPORTING AND PROCESSING A PLURALITY OF ARTICLES, AND SHAPED ARTICLE HAVING SERIALLY REGISTERED COMPONENT IMAGES

BACKGROUND OF THE INVENTION

1. Field of Invention

This invention relates to an apparatus and method for transporting a plurality of articles for subsequent processing. In particular, this invention relates to a method and apparatus in which a plurality of articles are introduced into article receiving pockets that releasably clamp the article in a predetermined position so that one or more processes can be performed on the article while it is maintained in the predetermined position. For example, the invention can be applied to pharmaceutical capsules or tablets which are positioned within pockets of a conveyer loop in a predetermined position to receive a series of drilled holes which act as a time-release mechanism. In addition, the apparatus and method according to illustrative embodiments of the invention can be applied to printing multiple colors on edible or non-edible articles in registered relationship to one another.

This invention also relates to a shaped edible or non-edible article including a composite image formed on a non-planar portion of the article having first and second component images that are of different color and serially registered with respect to one another.

2. Description of Related Art

U.S. Pat. No. 5,894,801 to Ackley describes the method and apparatus for conveying a plurality of pellet-shaped articles, such as pharmaceuticals. The conveyer conveys the pharmaceuticals past one or more article modifying devices, such as a laser that forms in the pharmaceuticals drilled or blind bore holes that act as a mechanical time-release mechanism. Lasers are known from U.S. Pat. No. 5,376,771, incorporated herein by reference. However, the system disclosed in U.S. Pat. No. 5,894,801 may not be suitable if the pharmaceutical is required to have a plurality of holes drilled therein because the pharmaceuticals vibrate and move as they are being conveyed on the conveyer. Moreover, the systems disclosed in U.S. Pat. No. 5,894,801 are not suitable to process articles on which two or more coordinated processes are to be performed on the article in a registered or precise fashion. For example, the system in this U.S. patent is not suitable for serially printing first and second component images of composite image in registered relationship to one another. Moreover, the system in U.S. Pat. No. 5,894,801 is at best usable for printing first and second images on first and second sides of an article, but the images are on opposite sides of the article are not in registered relationship to one another. Moreover, systems such as shown in U.S. Pat. Nos. 5,433,146, 5,768,996 and 5,836,243, all incorporated herein by reference, are not suited for carrying out a coordinated series of printing operations, because the first printing operation causes the articles to move within the article receiving pockets, so that any processing following the first printing operation will not be in registered relationship with the first printing operation. Furthermore, there are no means provided in this latter group of Patents for maintaining the articles in a predetermined lateral, longitudinal and rotational position during serial printing.

International Application WO/97/16075 shows a method and apparatus for printing on flat confectionery products, such as bubblegum. Flat sheets of bubblegum are situated in recesses having dimensions larger than that of the flat sheets of bubblegum. A guide rail is used to laterally shift the bubblegum sheets against the common side of the recess before printing, but no means are provided to prevent rotational or longitudinal shifting because the recesses are larger than the bubblegum and the bubblegum can be shifted when the printer contacts the bubblegum. The recesses do not position the bubblegum in a predetermined lateral, longitudinal and rotational position. In addition, an additional mechanical hold down member and/or vacuum is required to hold the bubblegum in position while traveling through the various processing stations, such as a dedusting station.

SUMMARY OF THE INVENTION

Illustrated embodiments of the invention are directed to methods and apparatuses for transporting and processing a plurality of articles. The articles are clamped or fixed in a predetermined lateral, longitudinal and rotational position while being conveyed such that one or more processes can be performed on the article while it is maintained in the predetermined position. For example, the article can be clamped between two adjacent carrier bars of a conveyer loop such that a laser drill can drill a plurality of laser holes in precise locations on the article. In addition, the articles can be held in a fixed or clamped position while being conveyed past multiple processing stations that are coordinated with one another, such as first and second printing stations that print first and second component images of a composite image in serially registered relationship with one another.

In illustrative embodiments of the invention, an apparatus is provided for transporting and processing a plurality of articles. The apparatus comprises a transport loop having a plurality of carrier bars and a plurality of pockets formed between adjacent ones of the carrier bars. The articles are laterally, longitudinally and rotationally positioned within the pockets at a predetermined position such that a portion of the articles is exposed. The articles may be exposed while protruding from the carrier bars or recessed within the pockets. At least a first processing station in a first position along the transport loop performs the first operation on the exposed portion of the articles while within the pockets in the predetermined position. The articles may be pharmaceutical tablets or capsules and the first processing station may be a drill that creates a series of drilled holes on the pharmaceutical tablet that serve as a mechanical time-release mechanism. The apparatus may further comprise a second processing station downstream from the first processing station that performs a second operation on the articles while in the predetermined position, the first and second operations being coordinated with one another. In another preferred embodiment, the first and second processing stations can be first and second printers that print first and second component images on the articles in registration with one another to form a composite image.

An illustrative method for transporting and processing a plurality of articles comprises introducing a plurality of articles into a plurality of pockets formed between adjacent carrier bars, clamping the articles between the carrier bars so as to laterally, longitudinally and rotationally position the articles within the pockets at a predetermined position, at least a portion of the articles being exposed, and performing a first operation on the exposed portion of the articles while in the predetermined position. The invention also contemplates an article, an edible article and a shaped edible article made according to this method.

According to other illustrative embodiments, a shaped edible article comprises a surface having at least one non-planar portion including at least first and second image areas adapted to receive a composite image. A first component image of the composite image is formed on the first image area using a first printer defining a printing plane spaced from the first and second image areas at variable distances due to the non-planar surface of the first and second image areas. The first component image comprises an edible ink of a first color. A second component image of the composite image is formed on the second image area using a second printer in the printing plane and positioned downstream of the first printer, the second component image comprising an edible ink of a second color different from the first color. The first component image is formed adjacent and in registration with the second component image to form the composite image regardless of the variable distances by which the first and second printing areas are spaced from the printing plane. The shaped edible article may also be a non-edible article.

These and other objects and aspects in the invention will be described in or apparent from the following detailed description of illustrative embodiments of the present invention.

BRIEF DESCRIPTION OF THE DRAWINGS

Illustrative embodiments of the present invention will be described in conjunction with the following drawings, in which.

DETAILED DESCRIPTION OF PREFERRED EMBODIMENTS

Figure 1:
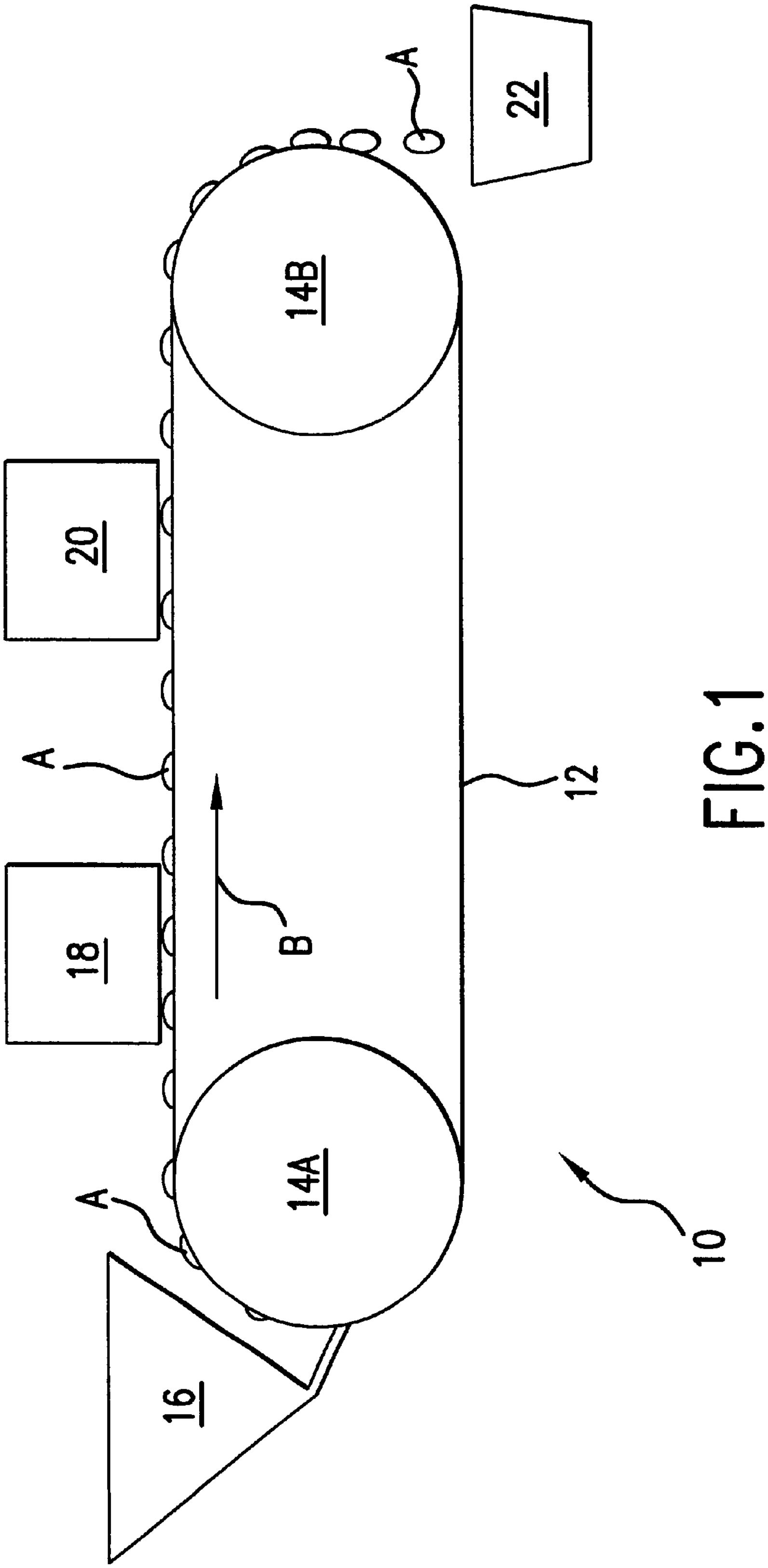
FIG. 1 is a schematic diagram illustrating an illustrative embodiment of an apparatus for transporting and processing a plurality of articles according to the present invention.

FIG. 1 shows the overall transporting and processing apparatus 10 according to an illustrative embodiment of the present invention. In one example, the transporting and processing apparatus includes a conveyer loop 12 which is entrained about a pair of sprockets 14A and 14B to travel in a direction indicated by an arrow B. Other configurations are also contemplated. A dispenser 16, e.g., a hopper, is disposed over the conveyer loop 12 and dispenses articles onto the conveyer loop 12. The articles can be edible or non-edible including confectioneries, non-confectioneries, candies, food, pharmaceuticals or any other discreet type articles. Several dispensers are well known in the art and may be used in the present invention, including but not limited to hoppers, rollers and feed dispensers. The dispenser 16 is positioned adjacent the sprocket 14A which causes the conveyer loop 12 to follow along a predetermined radius of curvature. The conveyer loop 12 travels around a curvilinear path made up of substantially linear sections and substantially non-linear sections, e.g., where the sprockets 14A and 14B are located.

After the dispenser 16 dispenses the articles to the conveyer loop 12, the articles are transported past one or more processing stations 18 and 20. The processing stations may be drilling stations, printing stations or any other process which can be applied to modify the appearance and/or shape of the articles. The processing stations 18 or 20 perform first and second processes on the articles which are coordinated with another. For example, the first processing station 18 may be a first printer and the second processing station 20 may be a second printer that serially print component images of a composite image on the articles in registered relationship with one another. The processing stations 18 and 20 are located on a portion of the conveyer loop 12 which is substantially linear or not less than a predetermined radius of curvature. The conveyer loop 12 transports the article past the sprocket 14B where the articles are released into a drop-off bin 22 or other suitable post processing receptacles, such as a blistered package, etc. The conveyer loop 12 follows this cycle to pick up additional articles from the dispenser 16.

Figure 2:
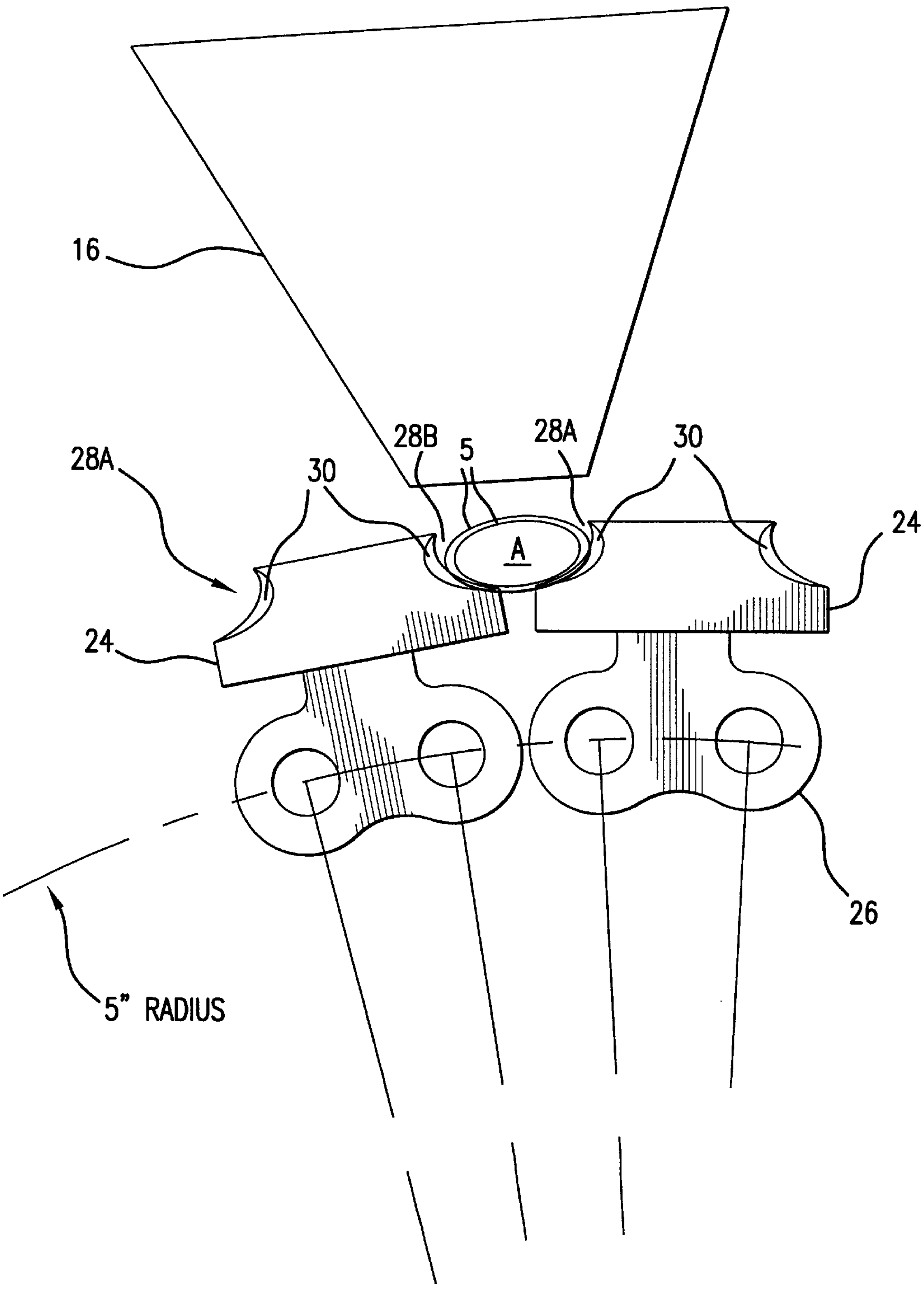
FIG. 2 illustrates adjacent carrier bars positioned along a non-linear portion of the conveyer belt shown in FIG. 1.

As shown in FIG. 2, the conveyer loop 12 comprises a plurality of carrier bars 24 linked by a chain 26. FIG. 2 shows a portion of the conveyer loop 12 where the dispenser 16 dispenses the articles A thereon. The sprocket 14A causes the conveyer loop 12 to follow a substantially non-linear or curved path such that the adjacent carrier bars 12 open up in clam shell-like fashion to allow insertion of the articles A into a pocket 28 formed by pocket halves 28A and 28B. The sprocket 14A causes the conveyer loop to have a radius of curvature that is sufficient to allow introduction of articles A within the pocket 28. For example, a 5 inch radius of curvature is sufficient to allow introduction of the articles A into the pockets 28. The pocket halves 28A and 28B may include a substantially resilient portion 30 that assists in gripping the articles and preventing damage to the articles in the event that they are edible articles or articles that are fragile. The resilient portion 30 also allows the size of the articles to vary within a predetermined range, e.g., between size S and size s. The resilient portion 30 may be a single element that covers both pocket halves 28A and 28B, or each pocket half 28A or 28B may have an individual resilient portion 30, as shown.

Figure 3:
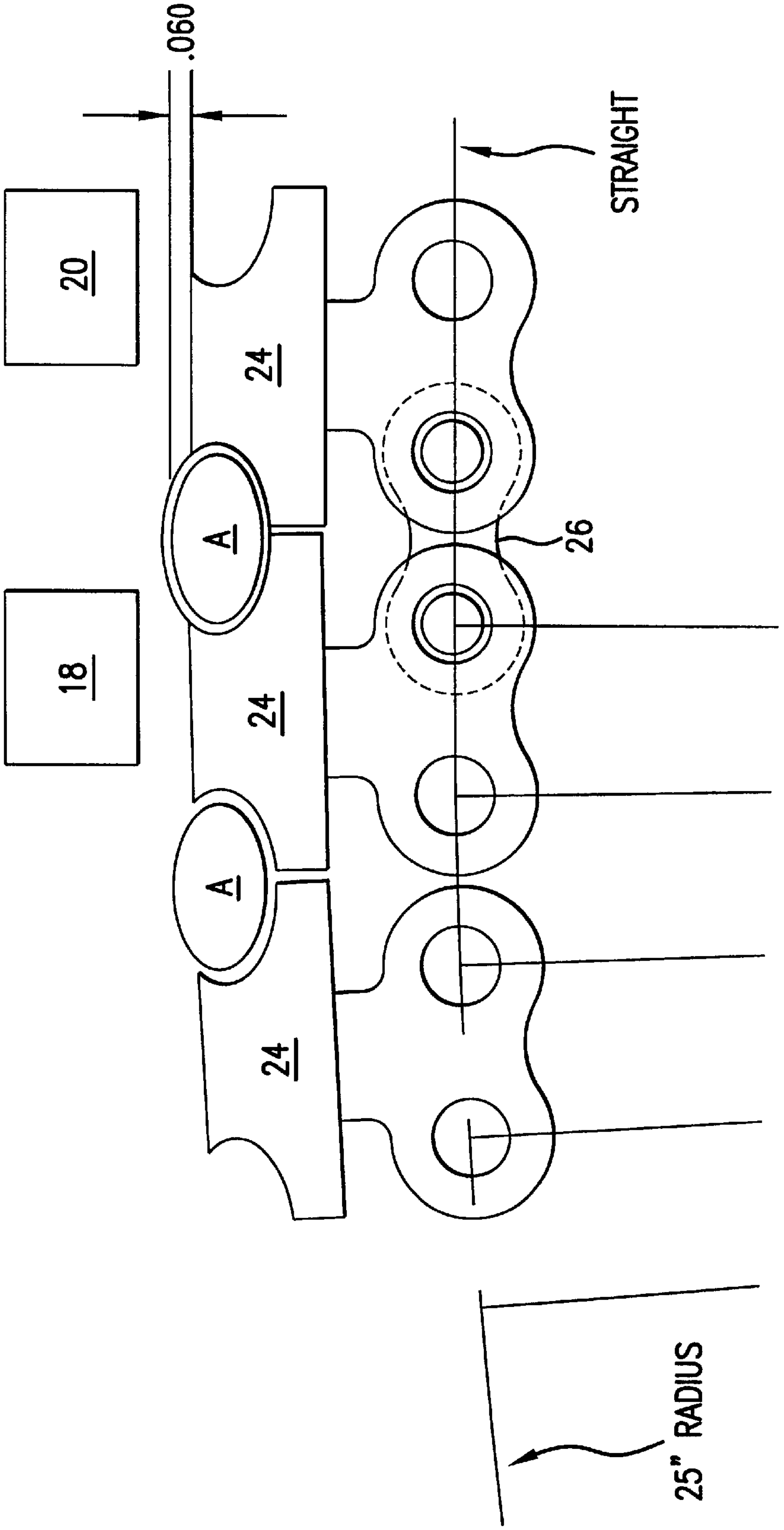
FIG. 3 illustrates a pair of adjacent carrier bars along a substantially linear portion of the conveyer belt shown in FIG. 1.
Figure 4:
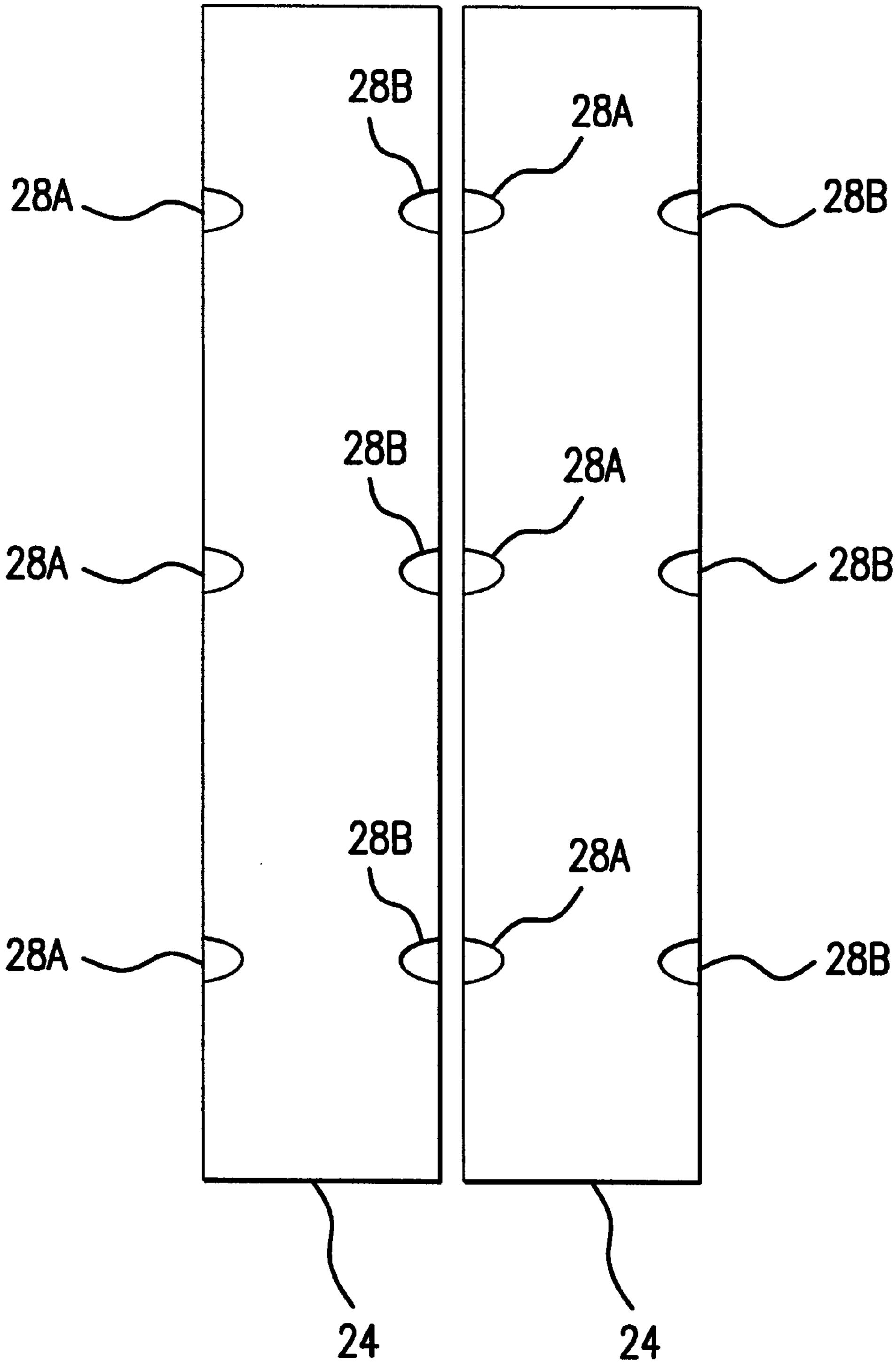
FIG. 4 is a plan view of a pair of carrier bars used for the conveyer belt of FIG. 1.

FIG. 3 shows the conveyer loop 12 downstream of the dispenser 16 as the articles pass below the first and second processing stations 18 and 20. At this point, the transport path moves from a 25" radius curvature to a substantially linear path, which causes adjacent carrier bars 24 to close in clam shell-like fashion to tightly grasp or clamp the articles in a predetermined position within the pockets 28. The pockets 28 are formed such that the articles will be laterally, longitudinally and rotationally positioned at a predetermined position within the pockets 28. Clamping of the articles in the fashion described above ensures that the articles will be maintained in the predetermined position along the first and second processing stations 18 and 20 as they perform their respective processes. Moreover, the respective processes can be accurately registered with respect to one another because the articles do not move when they are clamped between adjacent carrier bars along substantially linear portions of the transport path. FIG. 4 shows a plan view of two adjacent carrier bars 24. A series of the pockets 28 are formed along the length of the carrier bars at predetermined positions.

Figure 5:
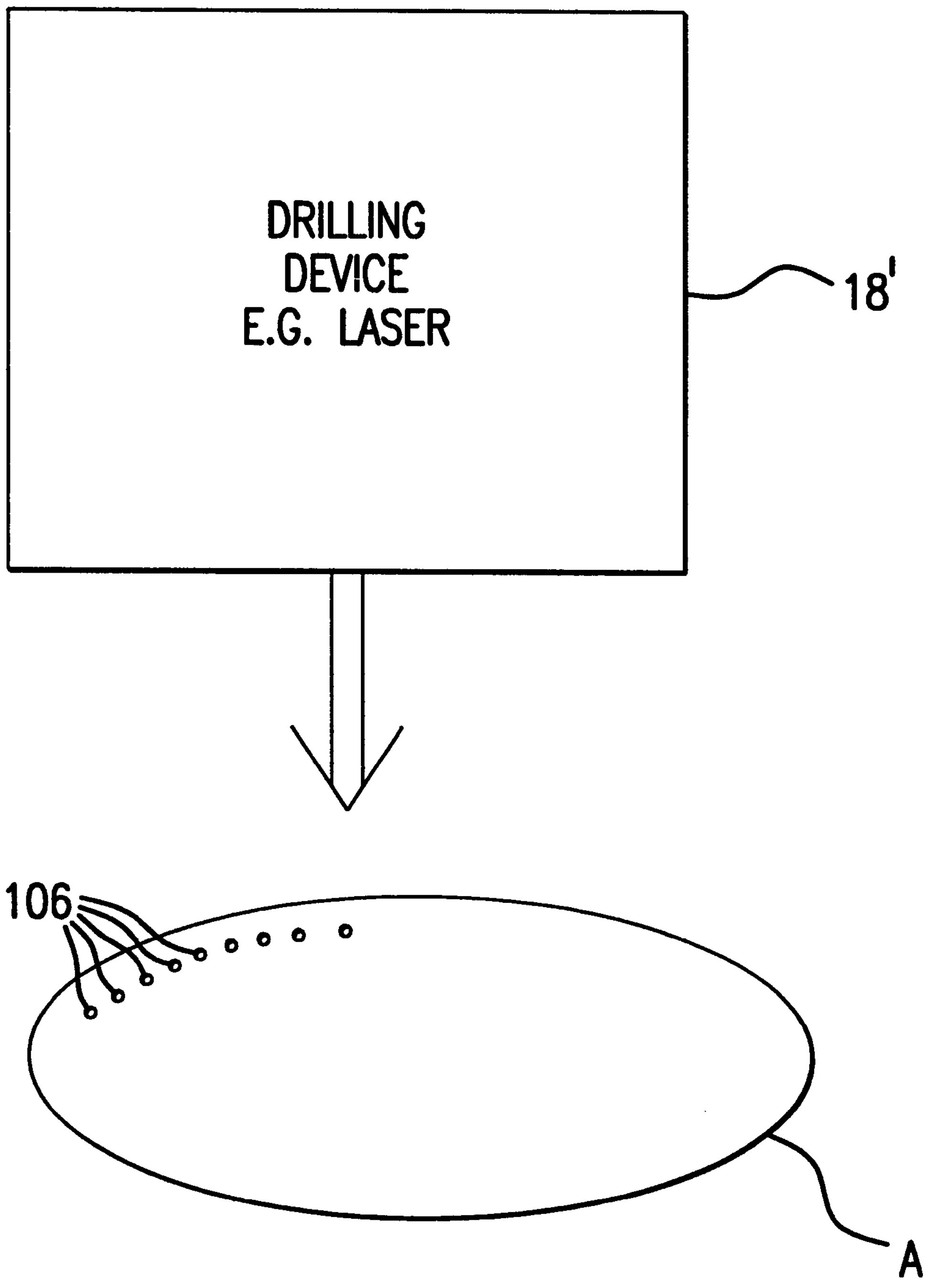
FIG. 5 illustrates a drilling device used as one of the processing stations shown in FIG. 1.

As shown in FIG. 3, each of the articles A includes a non-planar portion which protrudes above the surface of the carrier bars 24. The amount of protrusion can vary depending on the type and size of the article, and is shown as being about 1⁄16 of an inch (0.060"). Of course, it is not necessary for some article types, depending on the type of processing involved, to protrude above the carrier bars 24. The articles A may in fact be recessed within the pockets 28 so long as a portion is exposed to processing. The exposed portion of the articles A receives various processing from processing stations 18 and 20. For example, as shown in FIG. 5, the processing station may be a drilling device, e.g., a laser 18', that drills a series of holes or blind bores 106 into the article A. It is important that the article be maintained in the predetermined position, rotationally, laterally and longitudinally, such that the series of holes 106 is formed in the proper locations. Without the clamping effect of the adjacent carrier bars, the article A might otherwise move due to the vibration of the conveyer loop or movement caused by drilling previous holes. The drilling device 100 may drill holes 106 on articles A that are either recessed within the pockets 28 or protruding above the carrier bars 24.

Figure 6:
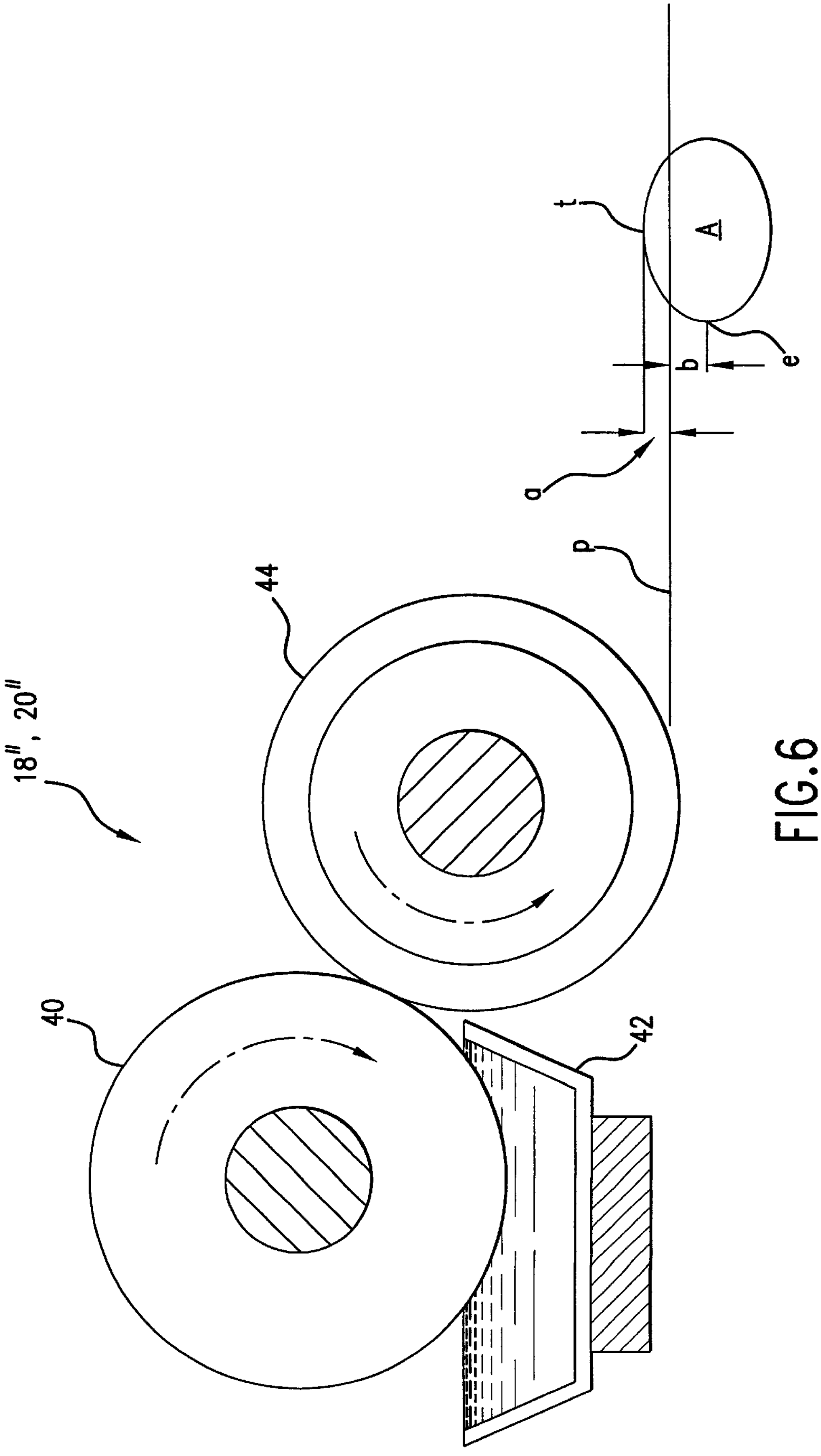
FIG. 6 illustrates an offset printing arrangement that can be used as one or both of the processing stations shown in FIG. 1.

FIG. 6 shows another illustrative example when the processing stations 18 and 20 are printing stations 18", 20" that print first and second images on the articles in registered relationship with one another to form a composite image. Each printing station 18", 20" includes a rotogravure cylinder or design roller 40, and ink pan 42 and an offset roller 44, usually made from resilient material such as rubber. The degree of resiliency of the offset roller 44 is selected based on the curvature and the toughness of the articles A. The clamping effect of adjacent carrier bars holds the articles A in a predetermined rotational, lateral and longitudinal position such that they do not move when conveyed from the first printing station to the second printing station. Thus, accurate registration of the component images can be achieved. Moreover, it is not necessary to provide the conveyer loop with any specialized device or mechanism for holding the articles A in the predetermined position. For example, neither a vacuum system nor mechanical hold down members are required in order to hold the articles A in the predetermined position.

The clamping effect of the adjacent carrier bars 24 maintains the articles A in the predetermined position between the first and second printing stations 18"and 20". Each offset roller 44 forms a component image on the article A. Each offset roller 44 defines a printing plane P which is spaced at variable distances from the surface of the articles A due to the non-planar surfaces of the articles A. This makes it especially difficult to print first and second component images in registered relationship with one another on the article. The present invention solves this problem by precisely positioning the articles within the pockets 28 and maintaining the articles A within the pockets 28 such that they are in a fixed lateral, longitudinal and rotational position. For example, the circumference or edge e of the articles is spaced at a distance b below the printing plane P while the top t of the article A is spaced at a distance a above the printing plane P. The distances a and b are selected depending on the size, curvature and the size of the printing area of the articles A.

Figure 7:
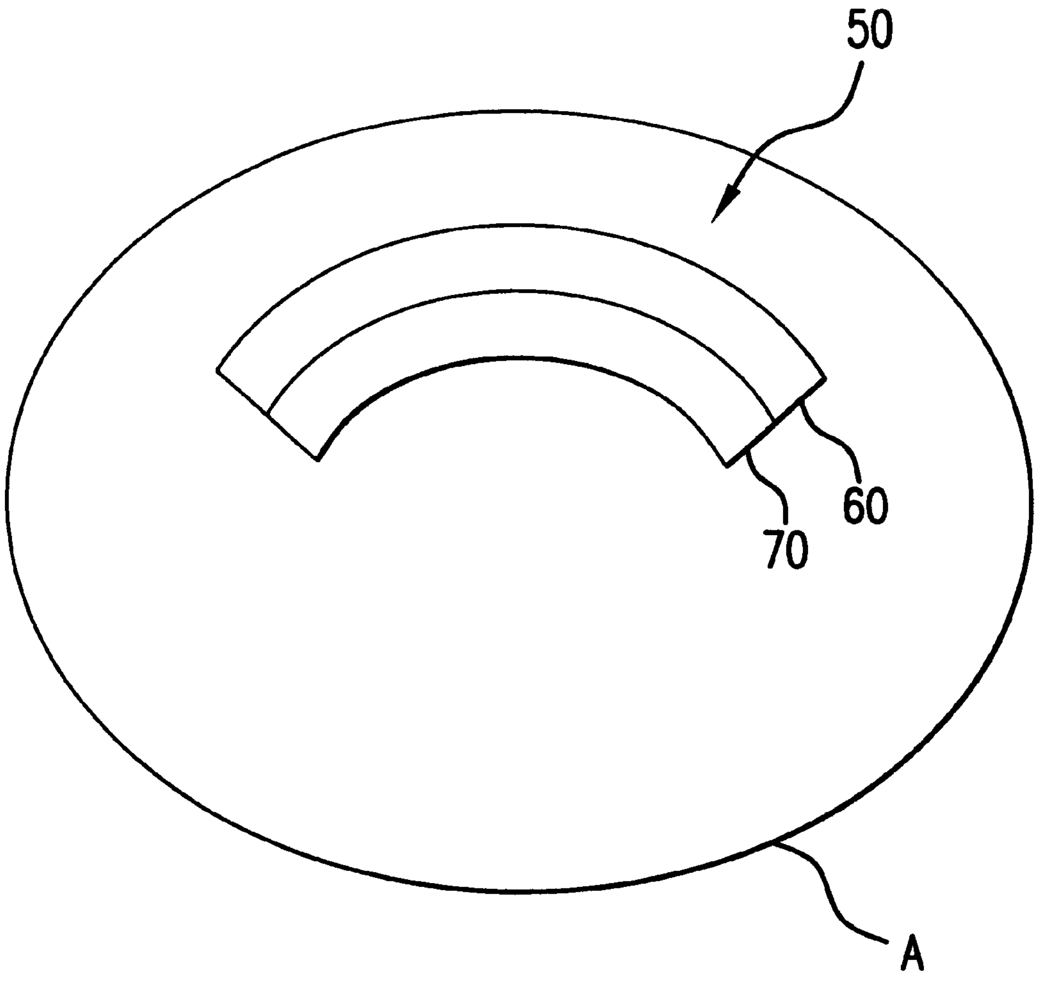
FIG. 7 illustrates a shaped article made using the apparatus of FIG. 1.

FIG. 7 shows an example of an article A that has a composite image 50 formed on a non-planar surface thereof. The composite image 50 is in the form of a rainbow including a first component image 60 and a second component image 70. The first and second component images 60, 70 are of different colors (from different print stations) and are serially registered to form the composite image 50. The article A can be an edible article so long as the inks are also edible.

While the embodiments disclosed herein are preferred, it will be appreciated from these teachings that various alternatives, modifications, variations or improvements therein may be made by those skilled in the art, which are within the spirit of the scope of the present disclosure.

What is claimed is:

1. An apparatus for transporting and processing a plurality of articles, the apparatus comprising:

a transport loop comprising a plurality of carrier bars, at least one cavity formed in an edge of each carrier bar at a position such that, when the carrier bar is at a position adjacent to another carrier bar, at least one pocket is formed between the adjacent carrier bars, said pockets laterally, longitudinally and rotationally tightly grasping articles at a predetermined position such that a portion of a surface of each article is exposed; and at least a first processing station at a first position along the transport loop that performs a first operation on the exposed portion of the surface of each article while tightly grasped within the pockets at the predetermined position.

2. The apparatus according to claim 1, wherein the articles are pharmaceutical tablets or capsules and the first processing station is a drill that creates a series of drilled holes on the pharmaceutical tablets or capsules.

3. The apparatus according to claim 1, further comprising a second processing station downstream of the first processing station that performs a second operation on the articles while in the predetermined position, said first and second operations being coordinated with one another.

4. The apparatus according to claim 1, wherein the first processing station is a first printer that prints a first component image of a composite image on the articles at a first printing position along the transport loop, and the second processing station is a second printer downstream from the first printing position that prints a second component image of said composite image on the articles in registration with the first component image of the composite image.

5. The apparatus according to claim 1, wherein the exposed portion of the articles protrudes above the carrier bars.

6. The apparatus according to claim 1, further comprising a resilient portion formed within each of the pockets.

7. A method for transporting and processing a plurality of articles, comprising:

introducing a plurality of said articles into a plurality of pockets formed between adjacent carrier bars;

tightly grasping said articles between said carrier bars so as to laterally, longitudinally and rotationally position said articles within the pockets at a predetermined position, a portion of a surface of each article being exposed; and performing a first operation on the exposed portion of the surface of each article while tightly grasped in the predetermined position.

8. The method according to claim 7, wherein the articles are pharmaceutical tablets or capsules, and the first operation comprises drilling a series of holes on the pharmaceutical tablets or capsules.

9. The method according to claim 7, further comprising performing a second operation on the articles downstream from the first operation while the articles are maintained in the predetermined position, said first and second operations being coordinated with one another.

10. The method according to claim 9, wherein the first operation comprises printing a first component image of a composite image on the articles, and the second operation comprises printing a second component image of said composite image on the articles in registration with the first component image of the composite image.

11. An apparatus for transporting and processing a plurality of articles including at least one of a pharmaceutical tablet and a pharmaceutical capsule, the apparatus comprising:

a transport loop comprising a plurality of carrier bars, at least one cavity formed in an edge of each carrier bar at a position such that, when the carrier bar is at a position adjacent to another carrier bar, at least one pocket is formed between the adjacent carrier bars, said pockets laterally, longitudinally and rotationally tightly grasping articles at a predetermined position such that a portion of a surface of each article is exposed; and at least a first processing station at a first position along the transport loop that performs a first operation on the exposed portion of each article while tightly grasped within the pockets at the predetermined position.

12. A method for transporting and processing a plurality of articles including at least one of a pharmaceutical tablet and a pharmaceutical capsule, comprising:

introducing a plurality of said articles into a plurality of pockets formed between adjacent carrier bars;

tightly grasping said articles between said carrier bars so as to laterally, longitudinally and rotationally position said articles within the pockets at a predetermined position, at least a portion of each article being exposed; and performing a first operation on the exposed portion of each article while tightly grasped in the predetermined position.

13. A carrier bar for transporting an article, the carrier bar comprising:

an attachment portion by which the carrier bar is attached to a conveyer; and at least one pocket portion formed in an edge of a carrier bar at a position such that, when the carrier bar is attached to the conveyor at a position adjacent to another carrier bar that has a corresponding pocket portion, a pocket is formed between the adjacent carrier bars by the pocket portions, the pocket having a closed position and an open position, an article being held in the pocket when the pocket is in the closed position and being inserted into or removed from the pocket when the pocket is in the open position, the pocket having, when in the closed position, an opening in a first plane and a maximum cross-section in a second plane parallel to the first plane, the opening being smaller than the maximum cross-section.

14. The carrier bar according to claim 13, wherein the at least one pocket portion comprises a plurality of pocket portions.

15. The carrier bar according to claim 13, wherein the pocket portion has a shape such that, when the carrier bar is attached to the conveyor adjacent to another carrier bar and the pocket is in the closed position, the article is laterally, longitudinally and rotationally positioned within the pocket at a predetermined position such that a portion of the article is exposed.

16. The carrier bar according to claim 15, wherein the exposed portion of the article projects above a top surface of the carrier bar.

17. An apparatus for transporting and processing a plurality of articles, the apparatus comprising:

a transport loop comprising a plurality of carrier bars as set forth in claim 15; and at least a first processing station at a first position along the transport loop that performs a first operation on the exposed portion of each article.

18. An apparatus for transporting a plurality of articles, the apparatus comprising:

a transport loop comprising a plurality of carrier bars as set forth in claim 13.

* * * * *